US009860872B2

United States Patent
Himayat et al.

(10) Patent No.: US 9,860,872 B2
(45) Date of Patent: Jan. 2, 2018

(54) IN-BAND CONTROL SIGNALING FOR INTEGRATED WLAN/3GPP RAT ARCHITECTURES

(71) Applicant: Intel Corporation, Santa Clara, CA (US)

(72) Inventors: Nageen Himayat, Fremont, CA (US); Jing Zhu, Portland, OR (US); Alexander Sirotkin, Petach Tikva (IL); Alexandre Stojanovski, Paris (FR); Mo-han Fong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 14/583,347

(22) Filed: Dec. 26, 2014

(65) Prior Publication Data

US 2015/0351079 A1  Dec. 3, 2015

Related U.S. Application Data

(60) Provisional application No. 62/007,392, filed on Jun. 3, 2014.

(51) Int. Cl.
*H04W 72/02* (2009.01)
*H04W 28/08* (2009.01)
*H04W 72/08* (2009.01)

(52) U.S. Cl.
CPC ........... *H04W 72/02* (2013.01); *H04W 28/08* (2013.01); *H04W 72/08* (2013.01)

(58) Field of Classification Search
CPC ..... H04W 28/08; H04W 72/08; H04W 72/02; H04W 16/14; H04W 88/06; H04W 72/0453; H04W 72/042; H04W 28/0252; H04W 84/12; H04W 72/04; H04W 88/10
See application file for complete search history.

(56) References Cited

U.S. PATENT DOCUMENTS

| 2012/0023189 A1 | 1/2012 | Giaretta et al. |
| 2012/0281564 A1 | 11/2012 | Zhang et al. |
| 2013/0083661 A1 | 4/2013 | Gupta et al. |

FOREIGN PATENT DOCUMENTS

| EP | 2723134 A1 | 4/2014 |

OTHER PUBLICATIONS

International Search Report and Written Opinion of corresponding PCT Application PCT/US15/28964 dated Aug. 18, 2015.
3GPP TR 37.834 V12.0.0, "3GPP; TSG RAN; Study on Wireless Local Area Network (WLAN)—3GPP radio interworking (Release 12)", Jan. 7, 2014 (http://www.3gpp.org/DynaReport/37834.htm).
(Continued)

*Primary Examiner* — Dung B Huynh
*Assistant Examiner* — Brian T Le
(74) *Attorney, Agent, or Firm* — Ledell Ansari, LLP

(57) ABSTRACT

An integrated WLAN/WWAN Radio Access Technology ("RAT") architecture is described, in which signaling used to control the integration of the WLAN/WWAN architecture is performed over the Packet Data Convergence Protocol ("PDCP") layer, and/or at other layers (e.g., a layer between the PDCP layer and the Internet Protocol ("IP") layer). When involving the PDCP layer, non-standard PDCP packets, including variable length PDCP packets, may be used. The integrated architecture may provide a network controlled framework for performing traffic steering and radio resource management.

25 Claims, 10 Drawing Sheets

(56) References Cited

OTHER PUBLICATIONS

Third Generation Partnership Project (3GPP), "Technical Specification Group Radio Access Network; Evolved Universal Terrestrial Radio Access (E-UTRA); Medium Access Control (MAC) protocol specification (Release 12)," Sep. 2014, TS 36.321 V12.3.0.

3GPP, "Technical Specification Group Radio Access Network; Evolved Universal Terrestrial Radio Access (E-UTRA); Packet Data Convergence Protocol (PDCP) specification (Release 12)," Sep. 2014, TS 36.323 V.12.1.0.

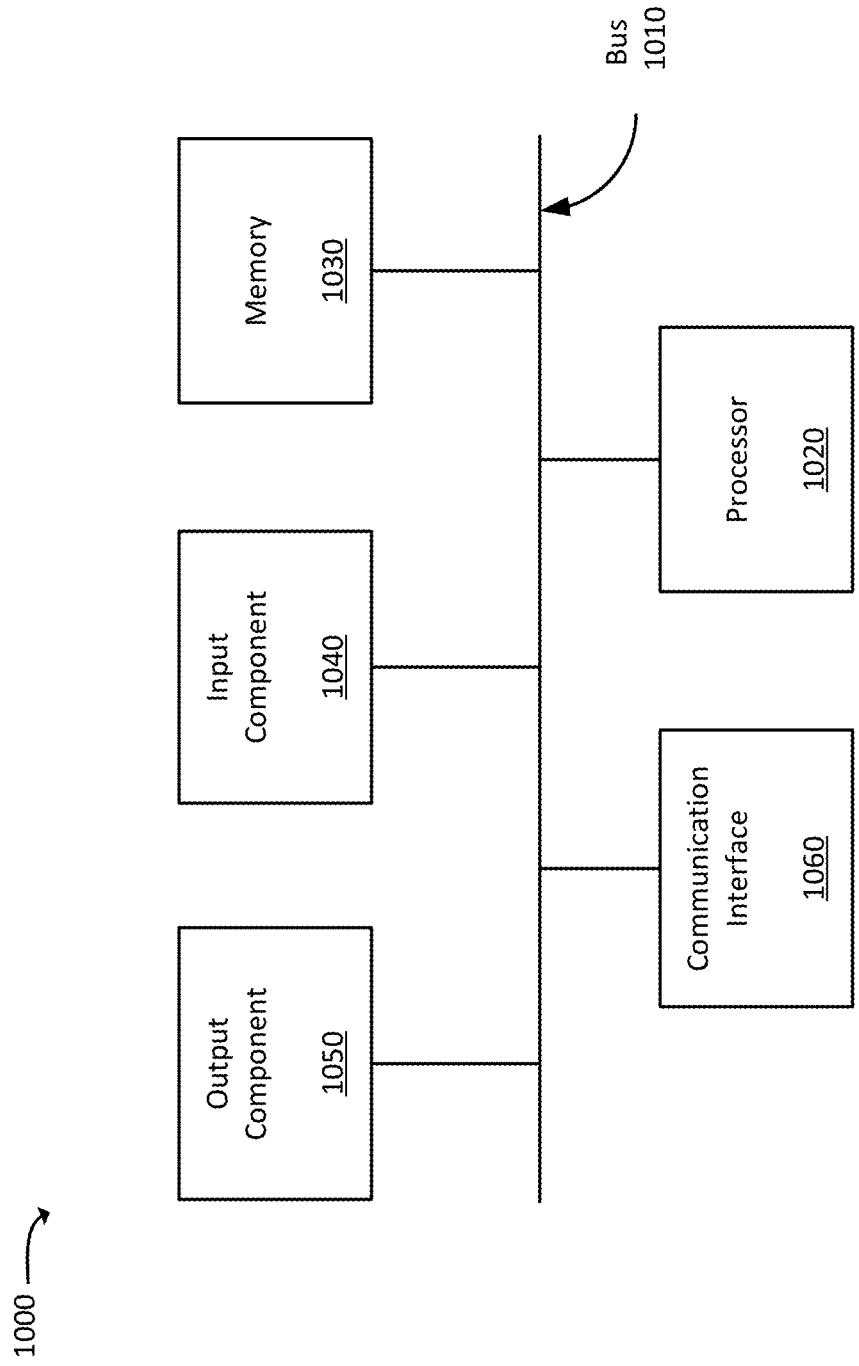

IN-BAND CONTROL SIGNALING FOR INTEGRATED WLAN/3GPP RAT ARCHITECTURES

CROSS-REFERENCE TO RELATED APPLICATIONS

The present application claims the benefit of U.S. Provisional Patent Application No. 62/007,392, which was filed on Jun. 3, 2014, the contents of which is hereby incorporated by reference as though fully set forth herein.

BACKGROUND

Growth in data traffic driven by smart phone devices, tablets, etc. can strain the capacity of wireless networks. One approach, used by the wireless industry, to address the growth in data traffic has been network densification wherein small cells are used to increase reuse of licensed spectrum, which continues to be scarce and expensive. Additionally, network operators have also increasingly utilized unlicensed spectrum (e.g., WiFi spectrum) to cope with the increasing capacity demand.

One industry trend facilitating greater cooperation across licensed and unlicensed radio networks is the adoption and deployment of integrated multi-radio small cells with co-located unlicensed (e.g., WiFi) and licensed radio spectrum interfaces. Integrated cells allow for leveraging common infrastructure and site locations, reducing the operational and capital expenditures of network operators. As networks move towards smaller cell sizes, the footprints of cellular and WiFi coverage may increasingly overlap, making such deployments feasible.

Control plane signaling (e.g., Radio Resource Configuration ("RRC") signaling, which may be used for, for instance, measurement reports, secondary cell configuration, and inter-radio access technology "RAT" session transfers) may incur delays with a typical average latency of 20-30 (or more) milliseconds. Further, frequent use of RRC signaling may be relatively expensive from a signaling overhead point of view.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

FIG. 10 is a diagram of example components of a device.

DETAILED DESCRIPTION OF PREFERRED EMBODIMENTS

Figure 1:
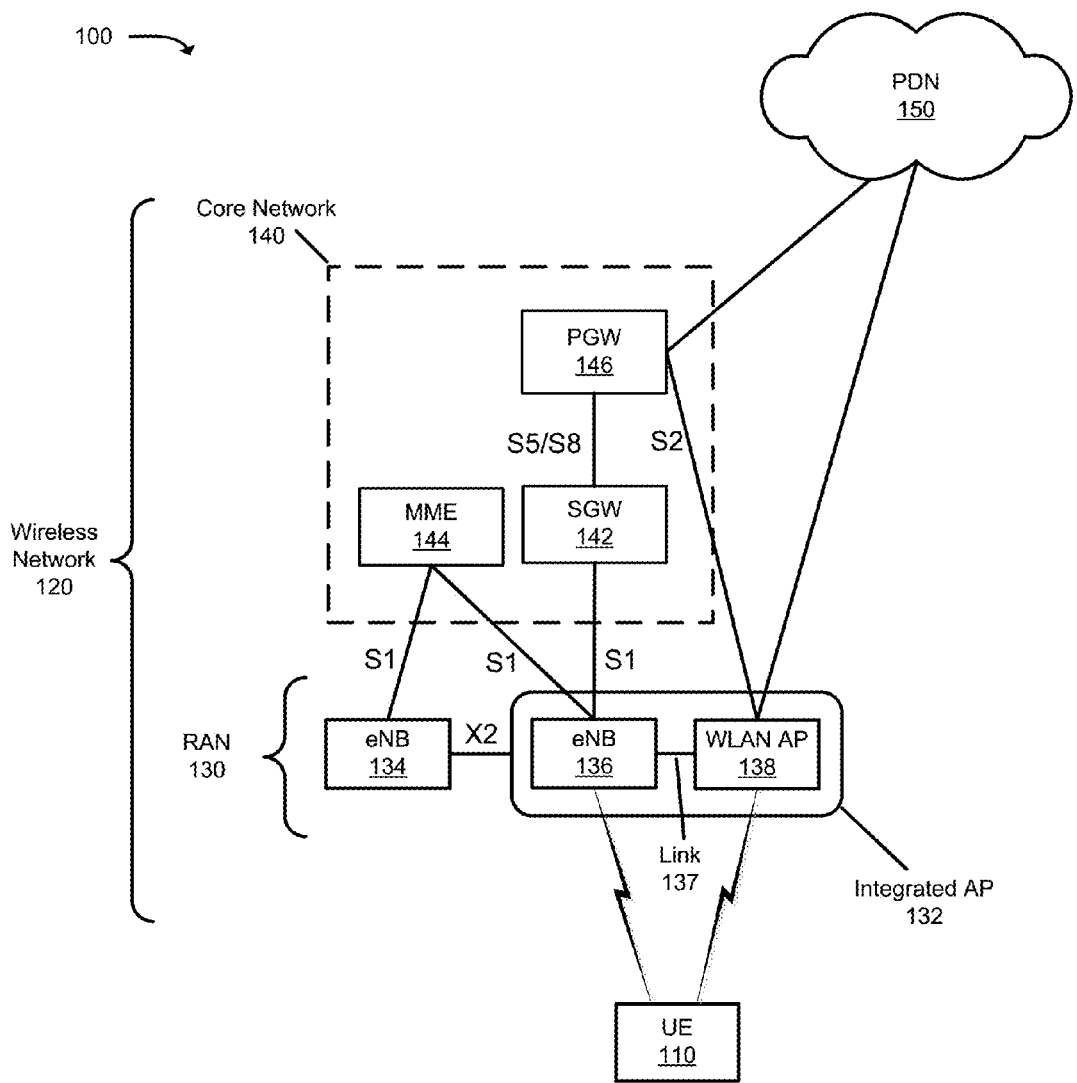
FIG. 1 is a diagram of an example environment in which systems and/or methods described herein may be implemented.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

As used herein, a "wireless local area network ('WLAN')" may refer to a wireless computer network that links two or more devices using a wireless distribution method that includes relatively short ranges. A WLAN may be used to create wireless networks within a limited area such as a home or office building. One example of a radio technology that may be used to implement a WLAN is WiFi (i.e., using Institute of Electrical and Electronics Engineers ("IEEE") 802.11-based standards). WLANs are typically implemented using unlicensed radio spectrum (i.e., radio frequencies that can be used without a license from a controlling government entity). In contrast to WLANs, "wireless wide area networks ('WWANs')," as used herein, may refer to networks that provide wireless access over larger areas. One example of a WWAN is a cellular network implemented using licensed radio spectrum. From a user's perspective, WWAN coverage may be provided seamlessly over a number of cells, in the cellular network, to potentially create a large area of uninterrupted network coverage. One example of a WWAN is a cellular radio network based on 3rd Generation Partnership Project ("3GPP") Long Term Evolution ("LTE") standards.

An integrated WLAN/WWAN Radio Access Technology ("RAT") architecture, as described herein, may allow for relatively tight coupling between WLAN and WWAN radio networks and for Radio Access Networks ("RANs"), in which simultaneous use of radio resources between the two RATs is employed. The architecture also allows for exploiting the reliability and the wide coverage of the WWAN to improve user experience over unlicensed spectrum. The WWAN link (e.g., the 3GPP LTE link) may be used as a control and mobility anchor for the WiFi radios in unlicensed spectrum, facilitating seamless inclusion of WiFi as a "virtual" or "extension" carrier in the 3GPP operator's RAN. With the integrated architecture, data may be offloaded from the WWAN to the WLAN but still controlled via the WWAN.

In some situations, a Radio Resource Control ("RRC") plane signaling protocol may be used to support an integrated WWAN/WLAN RAT. The RRC control plane protocol may allow the WLAN and WWAN user plane to be coupled at or above the media access control ("MAC") layer and may leverage the existing WWAN carrier aggregation framework. The WWAN/WLAN RAT architecture may include a network-controlled framework (potentially using information from mobile devices to assist in the control) for traffic steering and performing radio resource management.

As mentioned above, RRC signaling may introduce substantive amounts of delay, and/or may be relatively expensive in terms of control signaling overhead. As provided herein, some implementations provide for in-band signaling to control an integrated WWAN/WLAN RAT architecture. For instance, packets at the Packet Data Convergence Protocol ("PDCP") layer may be used to communicate information relevant to the WWAN/WLAN RAT architecture. For example, enhanced PDCP packets, in accordance with some implementations, may be used to provide measurement information from a UE to a WWAN component of an integrated WWAN/WLAN RAT architecture, RAT preference information from a UE to an eNB, RAT assignment instructions/parameters from an eNB to a UE, and/or other information associated with the operation of the integrated WWAN/WLAN RAT architecture. In some implementations, as also described herein, other types of in-band signaling may be used, in addition to (or in lieu of) enhanced PDCP packets.

In one implementation, an integrated RAT system may include a WLAN component to communicate with a UE using unlicensed frequency spectrum; and processing circuitry configured to receive information from the UE. The received information may be associated with a bearer between the UE and the WLAN component, and may be received via a PDCP layer. The processing circuitry may further be configured to determine, based on the received information, one or more parameters relating to the bearer between the UE and the WLAN component; and provide the one or more parameters to the UE. The one or more parameters may cause the UE to modify a manner in which traffic is transmitted from the UE over the bearer between the UE and the WLAN component.

In some implementations, providing the one or more parameters to the UE may include providing the one or more parameters to the UE at the PDCP layer. Additionally, the system of claim may further include an eNB of an LTE network. The information, associated with the bearer between the UE and the WLAN component, may be received via the eNB.

In some implementations, the one or more parameters may cause the UE to modify a ratio of: a first amount of traffic sent from the UE to the WLAN component, via the bearer between the UE and the WLAN component, and a second amount of traffic sent from the UE to a WWAN component, via a bearer between the UE and the WWAN component, using licensed frequency spectrum.

The information, received via the PDCP layer, may be received in a PDCP packet, in which a packet data unit ("PDU") type information field in a header of the PDCP packet may indicate that the PDCP packet includes the one or more parameters relating to the bearer between the UE and the WLAN component. The PDCP packet may further include information indicating a type of the one or more parameters. In some implementations, the type may include at least one of: Received Channel Power Indicator ("RCPI") information associated with the bearer between the UE and the WLAN component, Received Signal to Noise Indicator ("RSNI") information associated with the bearer between the UE and the WLAN component, channel busy/idle information associated with the bearer between the UE and the WLAN component, access delay measurements associated with the bearer between the UE and the WLAN component, interference information associated with the bearer between the UE and the WLAN component, round trip latency associated with the bearer between the UE and the WLAN component, uplink throughput of traffic sent, by the UE, via the bearer between the UE and the WLAN component, or downlink throughput of traffic received, by the UE, via the bearer between the UE and the WLAN component. In some implementations, the type includes a RAT preference indication.

The PDU type may be indicated by four or more bits in a first octet of the PDCP packet. In some implementations, the PDU type may be indicated by at least one bit other than the second, third, and fourth bits of a first octet of the PDCP packet. The PDCP packet may be of a variable size. The size of the PDCP packet may be specified by information included in the PDCP packet.

The one or more parameters may, in some implementations, include at least one of: a maximum uplink throughput of traffic that is permissible to be sent, by the UE, via the bearer between the UE and the WLAN component, a maximum amount of traffic that is permissible to be sent, by the UE, via the bearer between the UE and the WLAN component, a ratio of total traffic, sent by the UE, that is permissible to be sent via the bearer between the UE and the WLAN component, or a maximum probability of transmission of traffic, to the WLAN component, by the UE.

Additionally, the processing circuitry may further be configured to receive radio link quality information from the WLAN component. The one or more parameters may further be determined based on the radio link quality information received from the WLAN component.

In some implementations, the processing circuitry may further be configured to output a set of parameters to the WLAN component. The set of parameters may cause the WLAN component to modify a manner in which traffic is transmitted from the WLAN component, to the UE, over the bearer between the UE and the WLAN component.

In one implementation, a method of controlling an integrated RAT architecture may include receiving, by one or more devices of the integrated RAT architecture, information from a UE. The received information may be associated with a bearer between the UE and a WLAN component of the integrated RAT architecture, and may be received via a PDCP layer, via licensed frequency spectrum. The bearer between the UE and the WLAN component may be associated with unlicensed frequency spectrum. The method may further include determining, by the one or more devices and based on the received information, one or more parameters relating to the bearer between the UE and the WLAN component; and providing, by the one or more devices, the one or more parameters to the WLAN component. Providing the one or more parameters may cause the WLAN component to modify a manner in which traffic is transmitted from the WLAN component, to the UE, over the bearer between the UE and the WLAN component.

In some implementations, the one or more devices may include an eNB of an LTE network. The information, received via the PDCP layer, may be received in a PDCP packet, in which a PDU type information field in a header of the PDCP packet may indicate that the PDCP packet includes the one or more parameters relating to the bearer between the UE and the WLAN component. In some implementations, the PDCP packet may further include information indicating a type of the one or more parameters. The type may include at least one of: RCPI information associated with the bearer between the UE and the WLAN component, RSNI information associated with the bearer between the UE and the WLAN component, channel busy/idle information associated with the bearer between the UE and the WLAN component, access delay measurements associated with the bearer between the UE and the WLAN component, interference information associated with the bearer between the UE and the WLAN component, round trip latency associated with the bearer between the UE and the WLAN component, uplink throughput of traffic sent, by the UE, via the bearer between the UE and the WLAN component, or downlink throughput of traffic received, by the UE, via the bearer between the UE and the WLAN component. The type may, in some implementations, include a RAT preference indication.

The PDU type may indicated by four or more bits in a first octet of the PDCP packet, and/or by at least one bit other than the second, third, and fourth bits of a first octet of the PDCP packet. The PDCP packet may be of a variable size, and the size of the PDCP may be specified by information included in the PDCP packet.

The method may further include receiving radio link quality information from the WLAN component. The one or more parameters may further be determined based on the radio link quality information received from the WLAN component.

The one or more parameters include at least one of: a maximum throughput of traffic that is permissible to be sent, by the WLAN component to the UE, via the bearer between the UE and the WLAN component, or a maximum amount of traffic that is permissible to be sent, by the UE to the WLAN component, via the bearer between the UE and the WLAN component.

In one implementation, an integrated RAT system may include means for receiving information from a UE. The received information may be associated with a bearer between the UE and a WLAN component of the integrated RAT architecture. The received information may be received via a Packet Data Convergence Protocol ("PDCP") layer, via licensed frequency spectrum. The bearer between the UE and the WLAN component may be associated with unlicensed frequency spectrum. The system may further include means for determining, based on the received information, one or more parameters relating to the bearer between the UE and the WLAN component; and means for providing the one or more parameters to the UE, the one or more parameters causing the UE to modify a manner in which traffic is transmitted from the UE over the bearer between the UE and the WLAN component. In some implementations, the means for providing the one or more parameters to the UE may include means for providing the one or more parameters to the UE at the PDCP layer.

FIG. 1 is a diagram of an example environment 100, in which systems and/or methods described herein may be implemented. As illustrated, environment 100 may include UE 110, which may obtain network connectivity from wireless network 120. Although a single UE 110 is shown, for simplicity, in FIG. 1, in practice, multiple UEs 110 may operate in the context of a wireless network. Wireless network 120 may provide access to one or more external networks, such as packet data network ("PDN") 150. The wireless network may include radio access network ("RAN") 130 and core network 140. Some or all of RAN 130 may be associated with a network operator that controls or otherwise manages core network 140. Core network 140 may include an Internet Protocol ("IP")-based network, such as System Architecture Evolution ("SAE") core network or a General Packet Radio Service ("GPRS") core network.

UE 110 may include a portable computing and communication device, such as a personal digital assistant ("PDA"), a smart phone, a cellular phone, a laptop computer with connectivity to a cellular wireless network, a tablet computer, etc. UE 110 may also include non-portable computing devices, such as desktop computers, consumer or business appliances, or other devices that have the ability to wirelessly connect to RAN 130.

RAN 130 may represent a 3GPP access network that includes one or more access technologies. For example, RAN 130 may include base stations. In the context of an LTE-based access network, base stations may be referred to as eNBs, and are illustrated as eNBs 134 and 136. Some of the eNBs, such as eNB 136, may be associated with an integrated AP, such as integrated AP 132. Other eNBs, such as eNB 134, may not be associated with an integrated AP, and may be referred to as "legacy" eNBs. Integrated AP 132, in addition to providing functionality associated with a traditional eNB, may also include one or more WLAN (e.g., WiFi) APs 138. Integrated AP 132 may provide RAN-based coordination and simultaneous use of the radio resources between different RATs (e.g., 3GPP cellular (WWAN) and WiFi (WLAN)).

WLAN AP 138 may carry user plane and/or control plane traffic to PGW 146 via an S2 interface (e.g., an S2a interface, an S2b interface, an S2c interface (as specified in 3GPP standards) and/or a similar interface). Additionally, or alternatively, WLAN AP 138 and/or WLAN AP 139 may carry user plane and/or control plane traffic to PDN 150 via some other technique, such as through a modem and/or gateway associated with an Internet service provider ("ISP"), which may, in some situations, be a separate entity than a provider of core network 140. eNBs (such as eNBs 134 and 136) may communicate with each other via an X2 interface (e.g., as defined by a 3GPP standard). In some implementations, eNBs may obtain capability information regarding other eNBs (e.g., information regarding whether a particular eNB supports integrated mode, which may be used during handovers from one eNB to another).

In some implementations, integrated AP 132 may be implemented such that eNB 136 and AP 138 may be physically co-located as part of an integrated multi-radio small cell. Alternatively or additionally, integrated AP 132 may be implemented such that eNB 136 and AP 138 are physically separated but logically co-located, such as via an external, low-latency standardized or proprietary interface that may be used to connect eNB 136 with AP 138. In either case, link 137, which may include a proprietary or other type of low-latency interface, may be implemented between eNB 136 and AP 138. In some implementations, signaling over link 137 may be a modified implementation of the X2 interface. The coverage ranges of eNB 136 and AP 138 may, in some implementations, be different and may or may not overlap.

Core network 140 may include an IP-based network. In the 3GPP network architecture, core network 140 may include an Evolved Packet Core ("EPC"). As illustrated, core network 140 may include serving gateway ("SGW") 142, Mobility Management Entity ("MME") 144, and packet data network gateway ("PGW") 146. Although certain network devices are illustrated in environment 100 as being part of RAN 130 and core network 140, whether a network device is labeled as being in the "RAN" or the "core network" of environment 100 may be an arbitrary decision that may not affect the operation of wireless network 120.

SGW 142 may include one or more network devices that aggregate traffic received from one or more eNBs 134 and/or 136. SGW 142 may generally handle user (data) plane traffic. MME 144 may include one or more computation and communication devices that perform operations to register UE 110 with core network 140, establish bearer channels associated with a session with UE 110, hand off UE 110 from one eNodeB to another, and/or perform other operations. MME 144 may generally handle control plane traffic. SGW 142 may include one or more network devices that aggregate traffic received from one or more eNBs and/or integrated APs 132. SGW 142 may generally handle user (data) plane traffic.

PGW 146 may include one or more devices that act as the point of interconnect between core network 140 and external IP networks, such as PDN 150, and/or operator IP services. In some implementations, PGW 146 may additionally, or alternatively, serve as the point of interconnect between WLAN AP 138 and PDN 150 (e.g., via an S2 interface). PGW 146 may route packets to and from the access networks, and/or the WLAN APs, and the external IP networks.

PDN 150 may include one or more packet-based networks. PDN 150 may include one or more external networks, such as a public network (e.g., the Internet) or proprietary networks that provide services that are provided by the operator of core network 140 (e.g., IP multimedia ("IMS")-based services, transparent end-to-end packet-switched streaming services ("PSSs"), or other services).

A number of communication interfaces, between various devices, are labeled in FIG. 1. The labeled communication interfaces may represent various protocols that are used to communicate between the various devices illustrated in FIG. 1. For example, eNBs 134 and 136 may communicate with SGW 142 using an S1 interface (e.g., as defined by a 3GPP standard), and SGW 142 may communicate with PGW 146 using an S5/S8 interface (e.g., as defined by a 3GPP standard).

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of environment 100 may perform one or more functions described as being performed by another one or more of the devices of environment 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Figure 2:
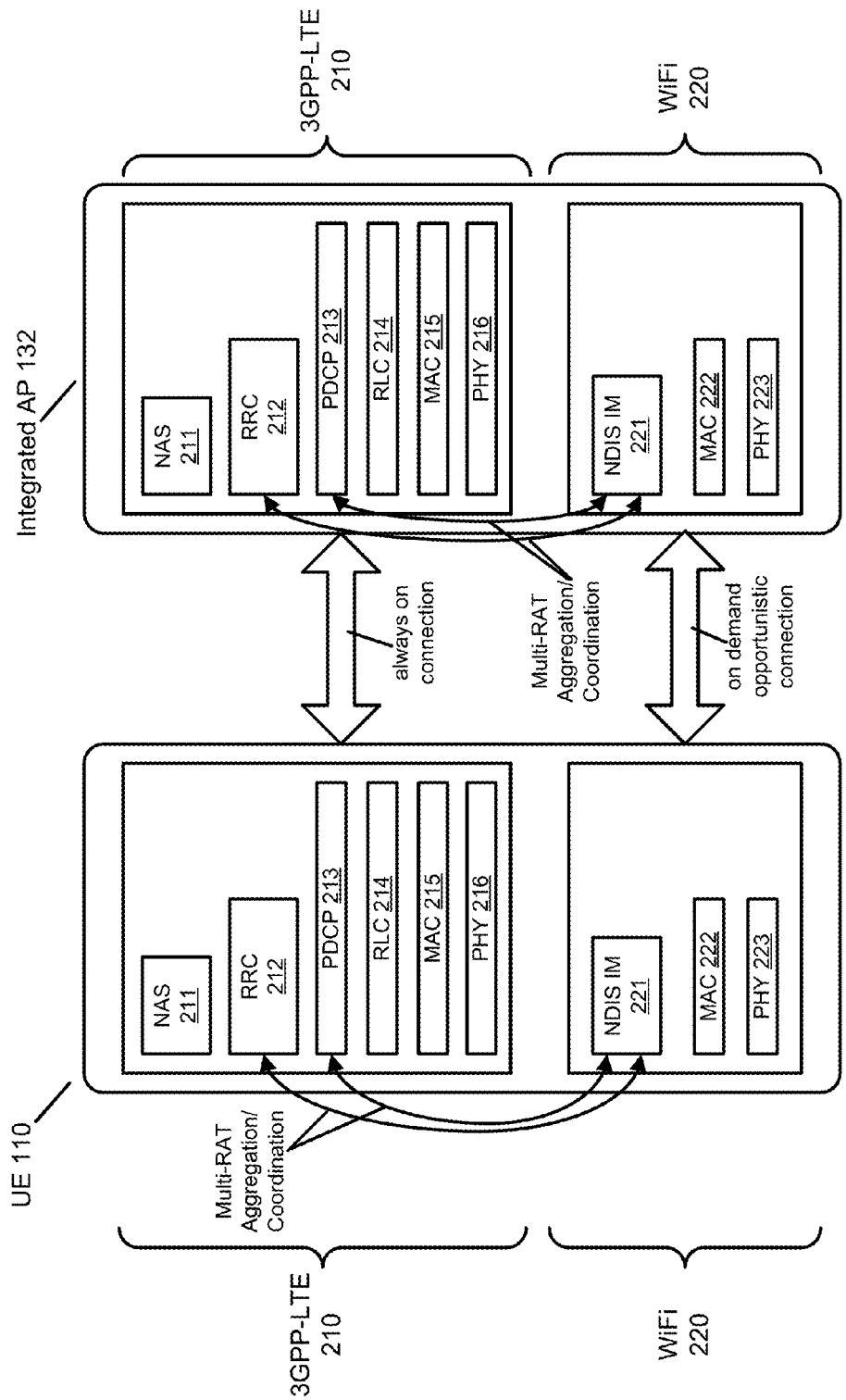
FIG. 2 is a diagram conceptually illustrating an example of various protocol layers, and the interaction of the protocol layers.

FIG. 2 is a diagram conceptually illustrating an example of various protocol layers, and the interaction of the protocol layers, in UE 110 and integrated AP 132. As previously discussed, UE 110 and integrated AP 132 may be devices that include multiple RATs (i.e., multi-mode radio devices), such as devices that include WWAN and WLAN RATs. In the implementations described below, UE 110 and integrated AP 132 will be particularly described as including 3GPP-LTE and WiFi RATs. In other implementations, other possible RATs could be used.

As illustrated in FIG. 2, UE 110 may include 3GPP-LTE component 210 and WiFi component 220. The protocol stack for 3GPP-LTE component 210 of UE 110 may include: Non Access Stratum ("NAS") layer 211, RRC layer 212, Packet Data Convergence Protocol ("PDCP") layer 213, radio link control ("RLC") layer 214, MAC layer 215, and physical ("PHY") layer 216. The protocol stack for WiFi component 220 of UE 110 may include: Network Driver Interface Specification ("NDIS") intermedia ("IM") layer 221, MAC layer 222, and PHY layer 223. The 3GPP-LTE RAT and WiFi RAT of integrated AP 132 may include protocol layers that correspond to the protocol layers of UE 110.

Referring to 3GPP-LTE component 210, NAS layer 211 may represent the highest stratum of the control plane at the radio interface. An example of the functions performed by NAS layer 211 may include mobility support for UE 110 and support of session management procedures to establish and maintain IP connectivity between UE 110 and PGW 146. RRC layer 212 may perform control functions relating to the LTE air interface control plane. An example of the functions performed by RRC layer 212 may include: broadcasting of system information related to the NAS, broadcasting of system information related to the access stratum ("AS"), paging, security functions, mobility functions, and Quality of Service ("QoS") functions.

PDCP layer 213 may perform functions, such as for example, header compression and decompression of IP data, transfer of data (user plane or control plane), maintenance of PDCP sequence numbers ("SNs"), and/or other functions relating to the PDCP layer. For example, as provided herein, PDCP layer 213 may be used to communicate control information (and/or other types of information) associated with the WLAN and/or WWAN communications of UE 110 and integrated AP 132. For instance, PDCP layer 213 of UE 110 may decode enhanced PDCP packets sent by integrated AP 132, and may generate enhanced PDCP packets.

RLC layer 214 may perform functions, relating to the LTE air interface control and user planes, such as transfer of upper layer packet data units, error correction, and in-sequence delivery of upper layer packet data units. MAC layer 215 may provide an interface to the network physical layer and may provide services such as channel access control services. PHY layer 216 may implement the basic networking hardware transmission technologies for 3GGP-LTE component 210.

Referring to WiFi component 220, NDIS IM layer 221 may represent an application programming interface ("API") for network interface devices. NDIS IM layer 221 may form the logical link control sublayer and may act as an interface to MAC layer 222. PHY layer 223 may implement the basic networking hardware transmission technologies for WiFi component 220.

In operation, 3GPP-LTE component 210 may maintain a connection with eNB 136 of integrated AP 132 (or with other eNBs). The connection may be an "always on" (or typically on) connection that corresponds to PCell connections for UE 110. WiFi component 220 may maintain "on demand" opportunistic connections with AP 138 of integrated AP 132. The on demand connections may correspond to SCell connections for UE 110. Control information relating to the on demand connections may be transmitted, to UE 110, via the PCell. In this manner, the 3GPP-LTE RAN may serve as a control and mobility anchor for WiFi WLANs. The WLAN may effectively be treated as a secondary carrier (layer 3 data pipe) for the primary carrier corresponding to the 3GPP network.

As is further illustrated in FIG. 2, signaling via RRC layers 212 ("Multi-RAT Aggregation/Coordination") may be used to coordinate the integration of the primary and secondary carriers. For example, RRC layer 212 may communicate with NDIS IM layer 221, or with other layers of WiFi 220, to support the integration of the primary and secondary carriers. Additionally, or alternatively, signaling via one or more other layers (e.g., PDCP layer 213) may be used to coordinate the integration of the primary and secondary carriers. The interface between WLAN AP 138 and eNB 136 may be coordinated via proprietary or standards-based enhanced X2 signaling (e.g., a modified version of an X2 standard), should these nodes be located in geographically distinct locations. In integrated AP 132, the multi-RAT aggregation/coordination link may correspond to link 137.

In order to effectively implement signaling via RRC layers 212 and/or PDCP layers 213, to coordinate the interworking of the primary and secondary carriers, modifications of PDCP and/or RRC signaling, relative to existing implementations of PDCP and/or RRC signaling, may be implemented with respect to one or more of the following functional areas (and/or other areas):

(1) Integrated WLAN Advertisement and Discovery;
(2) Exchange of UE WLAN Capabilities;
(3) WLAN Measurement and Reporting;
(4) Configuration of the SCell, Including Authentication and Association;
(5) Session Establishment over WLAN;
(6) Network-Controlled Bearer Switching;
(7) RAT Preference Indications; and
(8) Maximum per-UE probability of transmission for WLAN access.

Regarding integrated WLAN advertisement and discovery, in one implementation, a UE in idle mode that is performing cell selection/reselection may select an eNB, such as eNB 136 of integrated AP 132, according to existing E-UTRAN association and cell selection procedures, such as procedures based on 3GPP link quality. That is, cell selection may involve selecting the primary LTE carrier (PCell) for operation.

After PCell selection, discovery of SCells may be performed using dedicated signaling over the PCell. For instance, eNB 136 may send information regarding available WLAN APs (such as WLAN AP 138) via PDCP signaling. In this manner, advertising of secondary WLAN APs, such as advertisement through broadcast system information signaling, may not be needed.

Regarding the exchange of UE WLAN capabilities, in order for integrated AP 132 to be able to effectively use WLAN capabilities of UE 110, it may be desirable for eNB 136 to be able to query UE 110 to obtain an indication of the WLAN capabilities of UE 110. For example, it may be desirable for eNB 136 to determine whether UE 110 has available WiFi resources, WiFi protocols that are supported by UE 110, etc. The WLAN capabilities of UE 110 may be obtained via the primary carrier (i.e., via the PCell maintained through the LTE connection). For instance, UE 110 may output PDCP signaling, in accordance with some implementations, that include information regarding the WLAN capabilities of UE 110.

In one implementation, eNB 136 may query UE 110 for the WLAN capabilities of UE 110, using in-band PDCP signaling, instead of RRC signaling. The query can also be made after the establishment of default bearers on an as needed basis and may be made depending on several factors, such as, for example, network load conditions, a speed at which the UE is moving, or battery life of the UE. Alternatively or additionally, UE 110 may report the WLAN capabilities, of UE 110, as part of a UE capability reporting that is exchanged during a UE "attach" or "tracking area update ('TAU')" procedure.

UE 110 may provide WLAN measurement and reporting statistics to eNB 136, which may assist in decisions, by eNB, regarding the manner in which UE 110 should access WLAN AP 138. For example, UE 110 may send, via PDCP packets, measurement and reporting information such as Received Channel Power Indicator ("RCPI") information, Received Signal to Noise Indicator ("RSNI") information, channel busy/idle information, access delay measurements, interference information, QoS metrics (e.g., round trip latency, uplink and/or downlink throughput, etc.), and/or other types of measurements relating to the quality of the link between UE 110 and WLAN AP 138.

In some implementations, eNB 136 may provide authentication and association information, regarding WLAN AP 138, to UE 110, using PDCP signaling. For example, eNB 136 may provide a Service Set Identifier ("SSID"), Basic SSID ("BSSID"), Homogeneous Extended SSID ("HESSID"), virtual MAC ("v-MAC"), and/or another type of identifier associated with WLAN AP 138, to UE 110. Additionally, or alternatively, eNB 136 may provide one or more security keys (e.g., a WiFi Protected Access ("WPA") key, or another type of key) to UE 110, using PDCP signaling. Using the identifier(s) and/or the security key(s), UE 110 may access WLAN AP 138 (e.g., establish a WLAN bearer with WLAN AP 138).

In some implementations, eNB 136 may send instructions, to UE 110, to connect to, and/or disconnect from, a particular WLAN AP 138. These instructions may be sent, in some implementations, via PDCP packets. In some implementations, eNB 136 may send UE 110 instructions regarding a "split" of how much traffic (e.g., user plane traffic) should be sent via a particular bearer type (e.g., a "WLAN bearer"—a bearer (or set of bearers) between UE 110 and WLAN AP 138; or a "WWAN bearer"—a bearer (or set of bearers) between UE 110 and eNB 136). For example, eNB 136 may determine a bearer split ratio, which may specify a certain ratio or percentage of traffic from UE 110 should be sent via a WLAN bearer, and/or a certain ratio or percentage of traffic from UE 110 should be sent via a WWAN bearer. As another example, eNB 136 may set an absolute upper or lower bound on an actual amount of traffic (e.g., an upper or lower bound on throughput, and/or on amount of data transmitted) via a WLAN bearer.

UE 110 may provide RAT preference indications, via PDCP packets, to eNB 136, based on which eNB 136 may make RAT decisions for UE 110. For instance, UE 110 may indicate a preference towards WLAN bearers. In some implementations, the preference may be provided in the form of a value (e.g., a numerical value), of which differing values may indicate different levels of preference for a particular type of bearer. eNB 136 may use the preference information when determining, for instance, whether to hand off UE 110 to WLAN AP 138, whether to cause UE 110 to disconnect from WLAN AP 138, and/or when determining a bearer split (e.g., a bearer split ratio) for UE 110, with respect to WLAN AP 138.

eNB 136 may, in some implementations, provide a maximum UE probability of transmission for WLAN access, for a particular UE 110, via PDCP packets. The maximum UE probability of transmission for WLAN access may indicate, for example, a probability value, based on which UE 110 may access WLAN AP 138. UE 110 may make a probability check, based on the probability value, before attempting to connect to WLAN AP 138. For instance, assume that eNB 136 provides a probability value of 60% to UE 110. In this example, the probability that the probability check will pass is 60%, and the probability that the probability check will fail (not pass) is 40%. Thus, UE 110 has a 60% chance of passing the probability check, and if the probability check is passed, UE 110 will attempt to connect to WLAN AP 138.

The above-enumerated types of information, that may be provided using PDCP packets, are examples of information that may be provided using PDCP packets. In practice, PDCP packets may be used to provide other types of information related to controlling the integrated WLAN/WWAN RAT architecture. Furthermore, in some implementations, one or more of the above-described types of information may be provided using other types of signaling. For example, in some implementations, information regarding security keys may be provided via RRC signaling, while other types of information (e.g., information regarding RAT selection and/or radio quality indicators) may be provided via PDCP signaling.

FIGS. 3-6 illustrate example modified PDCP packets, in accordance with some implementations. These examples are not intended to be exhaustive, and are provided to illustrate some possible modifications, to the existing PDCP protocol, that may be used. In the following examples, PDCP packets are shown as groups of bit octets. In practice, PDCP packets, in accordance with some implementations, may be arranged differently.

Figure 3:
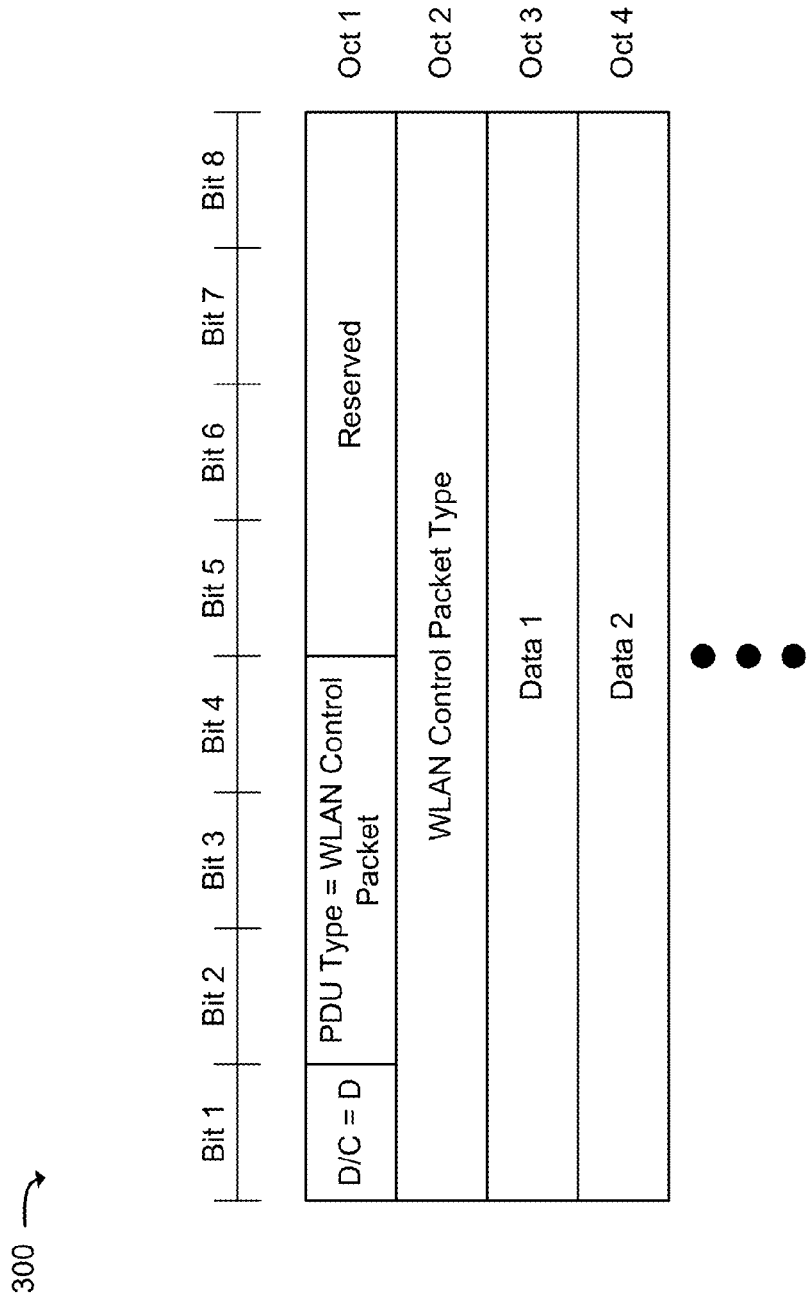
FIGS. 3-6 illustrate examples of enhanced Packet Data Convergence Protocol ("PDCP") packets, in accordance with some implementations.

As shown in FIG. 3, Octet 1 ("Oct 1") of example PDCP packet 300 may correspond to a header of PDCP packet 300. Bit 1 of the header (Octet 1) may indicate whether PDCP packet 300 is a data packet or a control packet ("D/C"). In this example, PDCP packet 300 is a data packet (denoted by the "D"). Bits 2-4 indicate a packet data unit ("PDU") type of PDCP packet 300. In this example, the PDU type may be a three-bit value that indicates that PDCP packet 300 is a modified (e.g., non-standard) PDCP packet, such as a WLAN control packet, in accordance with some implementations. Bits 5-8 of the header may be unused, and/or may be used for purposes not specifically described here. Octet 2 may indicate a type of WLAN control data included in the WLAN control packet ("WLAN Control Packet Type). For example, various values of the WLAN Control Packet Type may indicate that PDCP packet 300 includes information relating to integrated WLAN advertisement and discovery, UE WLAN capabilities, WLAN measurement and reporting, WLAN identifiers and/or keys, network-controlled bearer switching (e.g., WLAN connection/disconnection instructions, bearer split indications, etc.), UE RAT preference indications, maximum per-UE probability of transmission for WLAN access, and/or other types of information.

Other octets of PDCP packet 300 (e.g., Octets 3, 4, and/or additional octets) may include data (e.g., "Data 1," "Data 2," etc.) relating to the type(s) of information, specified by the WLAN Control Packet Type information (Octet 2). For example, if the WLAN Control Packet Type indicates that PDCP packet 300 includes measurement and reporting information, Data 1, Data 2, and/or information in other octets may include values relating to WLAN quality measurements, such as RSNI values, RCPI values, etc.

Figure 4:
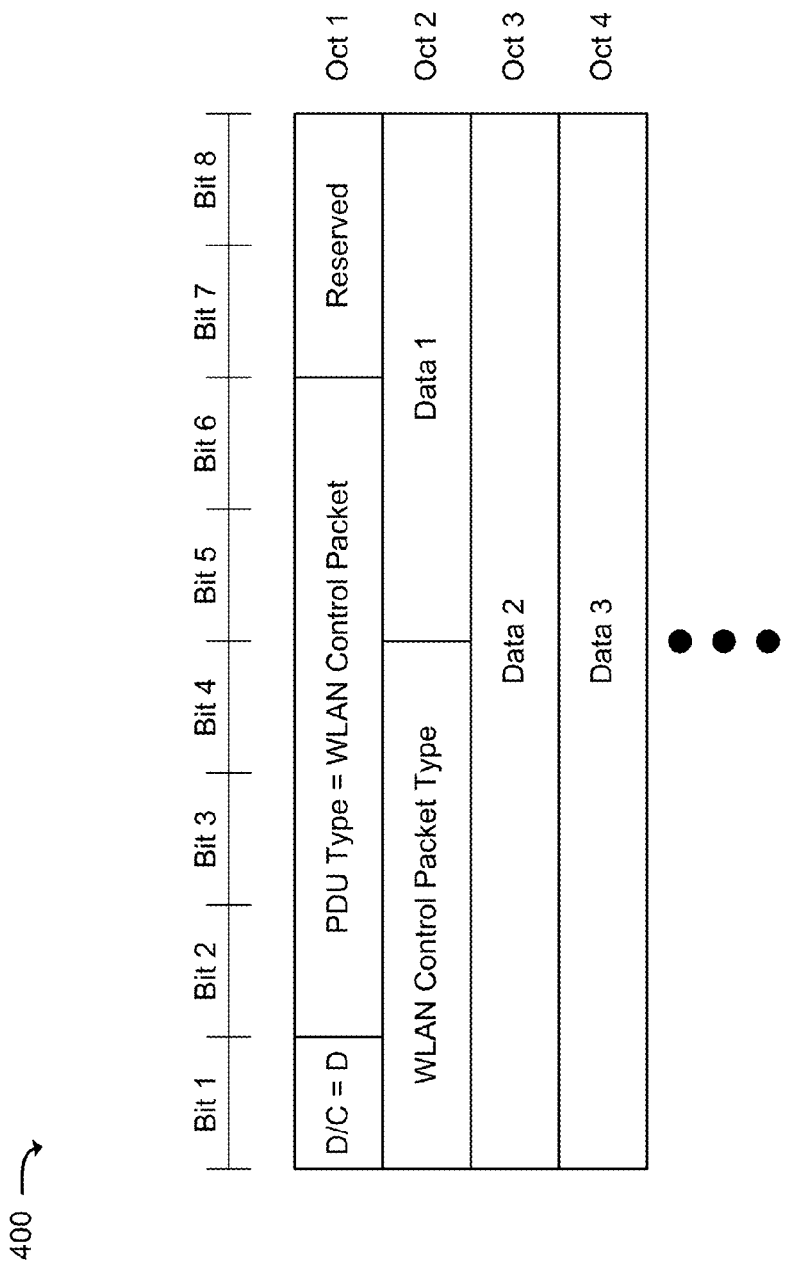

FIG. 4 illustrates another example of a modified PDCP packet 400, in accordance with some implementations. In the example shown in FIG. 4, the PDU type may be indicated by Bits 2-6 of Octet 1 (in contrast with the example shown in FIG. 3, in which the PDU type is indicated by Bits 2-5 of Octet 1). In some implementations, different bits, or different quantities of bits, may be used to denote that a particular PDCP packet is a WLAN control packet, than is shown in FIG. 4 (or in other figures presented herewith).

As further shown, Bits 1-4, of Octet 2 of PDCP packet 400, may indicate a WLAN Control Packet Type. In some implementations, the WLAN Control Packet Type may be denoted by different bits, or quantities of bits, than is shown in FIG. 4 (or in other figures presented herewith). Bits 5-8, of Octet 2, may include data relating to the type of the WLAN control packet, as well as Bits 1-8 of Octet 3 and Bits 1-8 of Octet 4 (and/or bits of additional octets).

Figure 5:
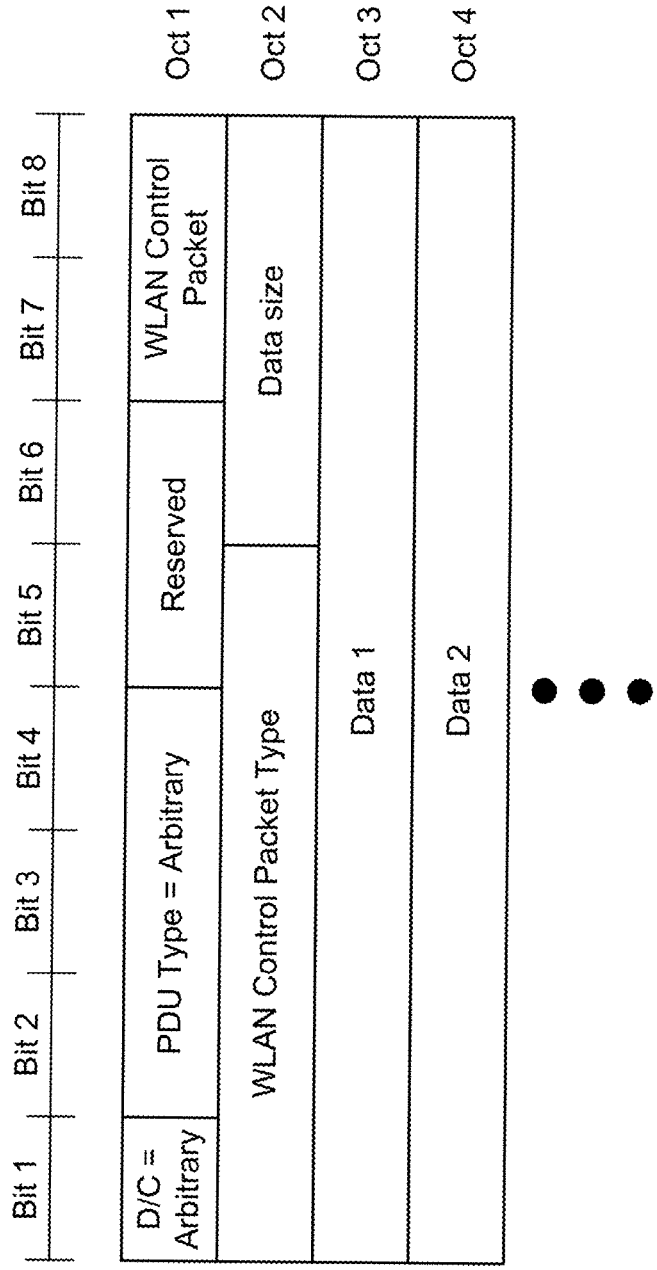

FIG. 5 illustrates yet another example of a modified PDCP packet 500. In this example, the denotation that PDCP packet 500 is a WLAN control packet may be indicated by Bits 7 and 8 of Octet 1. Thus, in this example, the conventional "D/C" and "PDU Type" bits (e.g., Bits 1-4 of Octet 1) may be arbitrary. In some implementations, a single bit (e.g., a single one of Bits 5-8 of Octet 1) or another quantity or combination of bits (e.g., Bits 5 and 6, Bits 5-7, Bits 6 and 9, and/or some other combination) may denote that PDCP packet 500 is a WLAN control packet.

As further shown in FIG. 5, Bits 1-5 of Octet 2 may indicate the WLAN Control Packet Type. Bits 6-8 of Octet 2 may indicate a size of the data associated with PDCP packet 500 ("Data Size"). For example, the Data Size may indicate a quantity of octets (e.g., a quantity of octets, following Octet 2) that include information relevant to the WLAN control packet. In this manner, modified PDCP packets, in accordance with some implementations, may have a variable length (e.g., which may be variable based on the amount of relevant data that is included in the packet). In other implementations, modified PDCP packets may have a predetermined size. While Data Size is shown, in FIG. 5, as being denoted by Bits 5-8 of Octet 2, in practice, other bits (or quantities) of bits may be used to denote the Data Size of a particular PDCP WLAN control packet.

Figure 6:
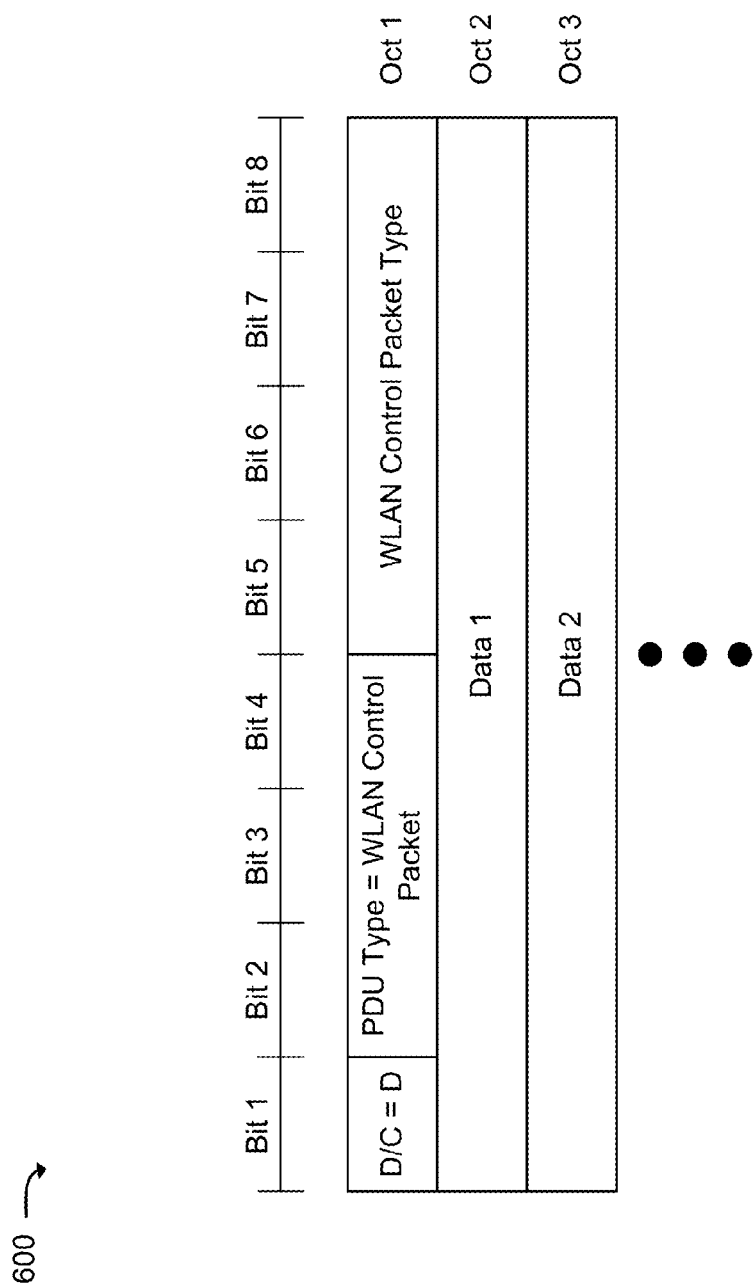

FIG. 6 illustrates another example modified PDCP packet 600, in accordance with some implementations. As shown in this example, Bit 1 of Octet 1 may indicate that PDCP packet 600 is a data packet ("D"). Bits 2-4 may indicate that the PDU Type is a WLAN control packet, and bits 5-8 may indicate the WLAN Control Packet Type. Octet 2, Octet 3, and/or other octets may include data relevant to the type of WLAN control packet.

As mentioned above, while specific examples were shown in FIGS. 3-6, of modified PDCP packets, in practice, other arrangements of modified PDCP packets may be used. For example, concepts shown in one of these figures may be combined with concepts shown in in another one of these figures. For instance, the example shown in FIG. 3 may be modified to include a Data Size (e.g., as described with respect to FIG. 5). As another example, the "D/C" bit may, in some implementations, be viewed as "arbitrary," in the presence of other information that indicates that a particular PDCP packet is a WLAN control packet.

Figure 7:
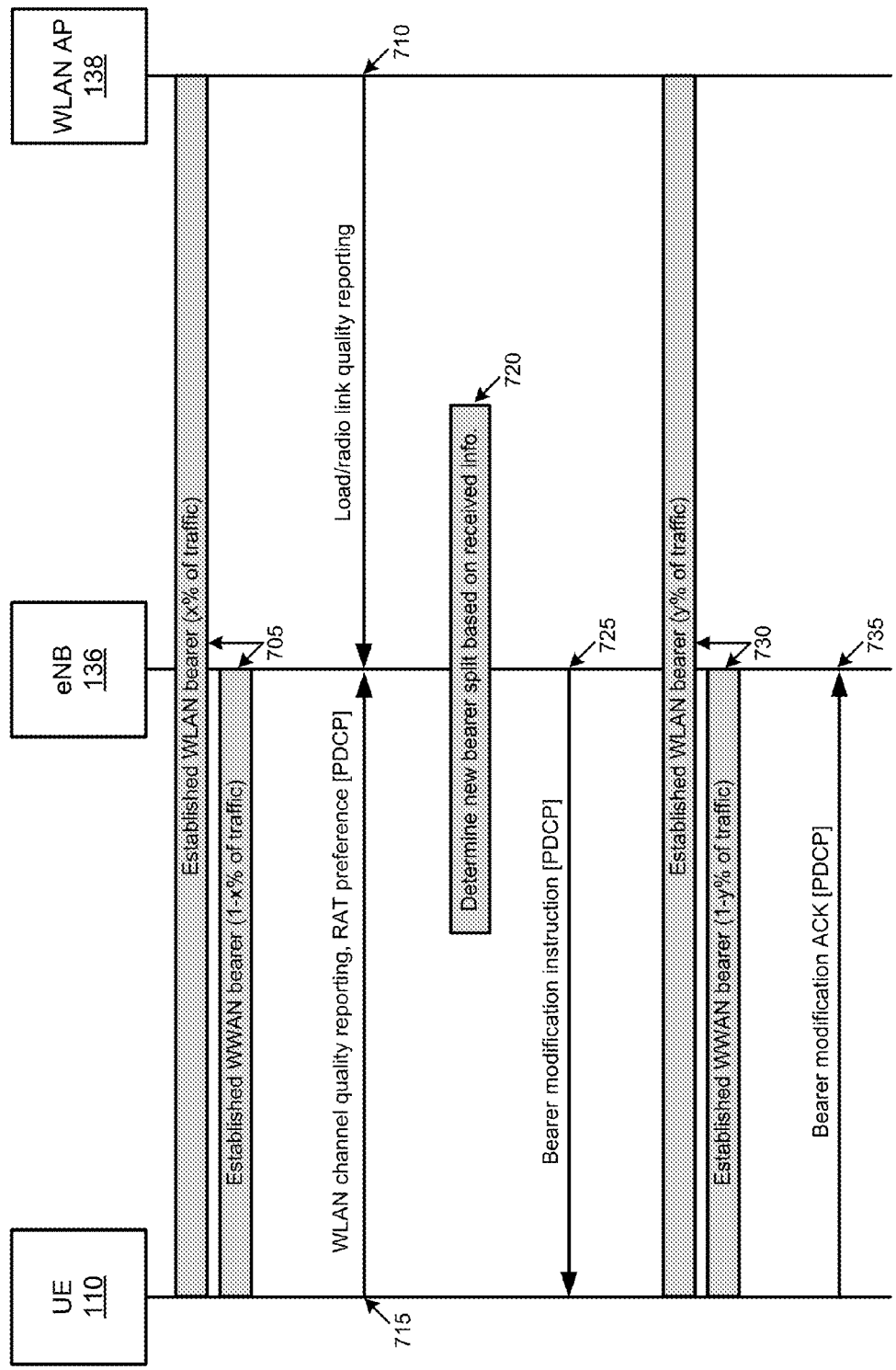
FIG. 7 illustrates an example signal flow relating to user equipment ("UE") modifying a bearer split ratio (between a wireless wide area network ("WWAN") bearer and a wireless local access network ("WLAN") bearer), based on in-band PDCP signaling received from a base station.
Figure 8:
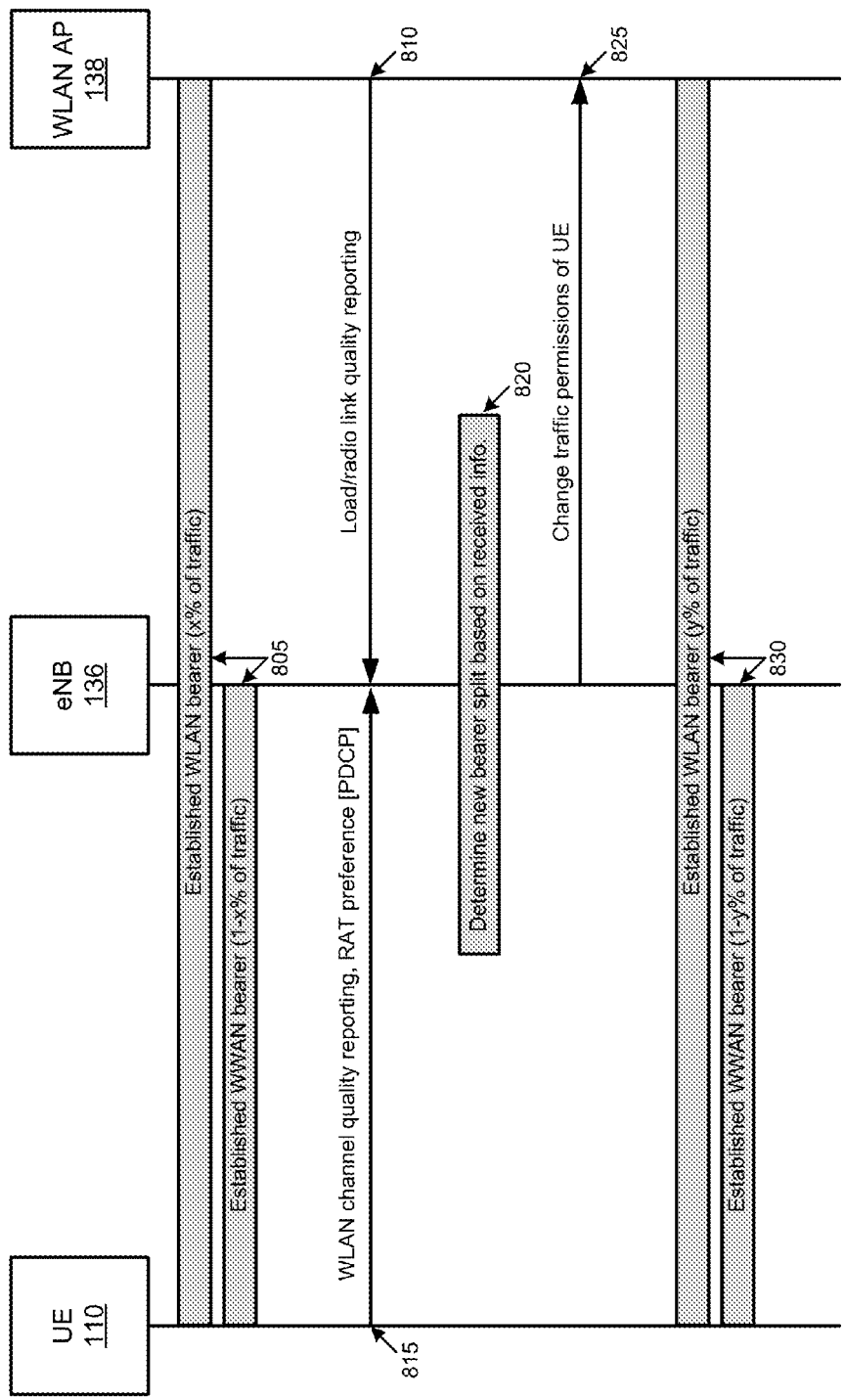
FIG. 8 illustrates an example signal flow relating on a WLAN access point ("AP") modifying a bearer split ratio, associated with a UE, based on signaling received from a base station.

FIGS. 7 and 8 illustrate example signal flows relating to the use of PDCP packets (e.g., PDCP packets 300, 400, 500, 600, and/or other types of PDCP packets) in the operation of integrated AP 132. For example, as shown in FIG. 7, UE 110 may establish (at 705) a bearer with WLAN AP 138 (a "WLAN bearer") and a bearer with eNB 136 (a "WWAN bearer"). UE 110 may transmit (or attempt to transmit) a particular percentage ("x %") of its traffic via the WLAN bearer, and may transmit (or attempt to transmit) the remainder of its traffic ("1−x %") via the WWAN bearer.

WLAN AP 138 may provide (at 710) load and/or radio link quality information to eNB 136 (e.g., via link 137). The load information may indicate, for example, how much overall load (e.g., across multiple UEs or other devices, and/or on a per-UE basis) is being experienced by WLAN AP 138. The radio link quality information may include RSNI information, RCPI information, and/or other information, from WLAN AP 138, indicating the quality of the radio link between UE 110 and WLAN AP 138. WLAN AP 138 may provide (at 710) the load and/or radio link quality reporting information on a periodic basis, and/or on another (e.g., intermittent) basis. For example, WLAN AP 138 may provide the information to eNB 136 based on a request from eNB 136, when a WLAN bearer is initially established between UE 110 and WLAN AP 138, etc.

As further shown, UE 110 may provide (at 715) WLAN channel quality reporting information, RAT preference information, and/or other information via PDCP packets (e.g., PDCP packets with a PDU type of "WLAN Control Packet," as described above). UE may provide (at 715) the information on a periodic basis, and/or on another (e.g., intermittent) basis. For example, UE 110 may provide the information to eNB 136 based on a request from eNB 136, when a WLAN bearer is initially established between UE 110 and WLAN AP 138, etc.

Based on the information provided (at 710 and/or 715) by WLAN AP 138 and/or UE 110, eNB 136 may make a determination (at 720) regarding the bearer split, associated with UE 110. For instance, as described above, eNB 136 may determine a new bearer split ratio for the WLAN bearer and the WWAN bearer associated with UE 110.

Based on the determination (at 720), eNB 136 may generate a PDCP packet (e.g., having the PDU type of "WLAN Control Packet"), which may include a bearer modification instruction to UE 110 (e.g., an instruction to modify the bearer split ratio). The bearer modification instruction may, for instance, indicate a maximum throughput or amount of traffic that UE is permitted to output via the WLAN bearer, may specify a ratio of traffic to output via the WLAN bearer versus the WWAN bearer, and/or may indicate a probability of transmission for WLAN access. In some implementations, the instruction may indicate types of traffic, and/or identities of applications, for which traffic is permissible to be transmitted via a WLAN bearer and/or a WWAN bearer.

As further shown, eNB 136 may output (at 725) the bearer modification instruction to UE 110, via one or more PDCP packets. Based on the bearer modification instruction, UE 110 may modify the bearer split ratio between the WLAN bearer and the WWAN bearer. For instance, after modifying the bearer split ratio, UE 110 may output (at 730) y % of traffic over the WLAN bearer (where "y" is a different value than "x"), and 1−y % of traffic over the WWN bearer. UE 110 may further output (at 735) one or more PDCP packets, indicating that UE 110 has modified the bearer split ratio (e.g., an acknowledgment ("ACK")).

FIG. 8 illustrates another example signal flow in accordance with some implementations. Some signals, shown in FIG. 8, are similar to signals described above with respect to FIG. 7. For the sake of brevity, these signals will not be described again in detail below.

As shown in FIG. 8, UE 110 may establish (at 805) a WLAN bearer (with WLAN AP 138) and a WWAN bearer (with eNB 136). WLAN AP 138 may provide (at 810) load/radio link quality reporting information (e.g., via link 137), and UE may provide (at 815) WLAN channel quality reporting information, RAT preference information, etc. (e.g., by sending one or more PDCP packets with the information) to eNB 136.

Based on the received information, eNB 136 may determine (at 820) a new bearer split. For instance, eNB 136 may determine permissions, which may be enforced by WLAN AP 138, which may serve to effectively modify the bearer split associated with UE 110, and/or to otherwise effectively limit the amount of traffic sent to and/or from UE 110 via the WLAN bearer. For instance, eNB 136 may determine a maximum throughput and/or amount of traffic that may be sent or received by UE 110 via the WLAN bearer (which may be enforced by WLAN AP 138), and/or may lower a priority (or other QoS parameter) relating to the processing of traffic, to or from UE 110, by WLAN AP 138.

eNB may output (at 825) the permissions to WLAN AP 138 (e.g., via link 137). WLAN AP 138 may enforce the permissions, effectively modifying (at 830) the bearer split ratio of traffic sent to and/or from UE 110 via the WLAN bearer and WWAN bearer.

Figure 9:
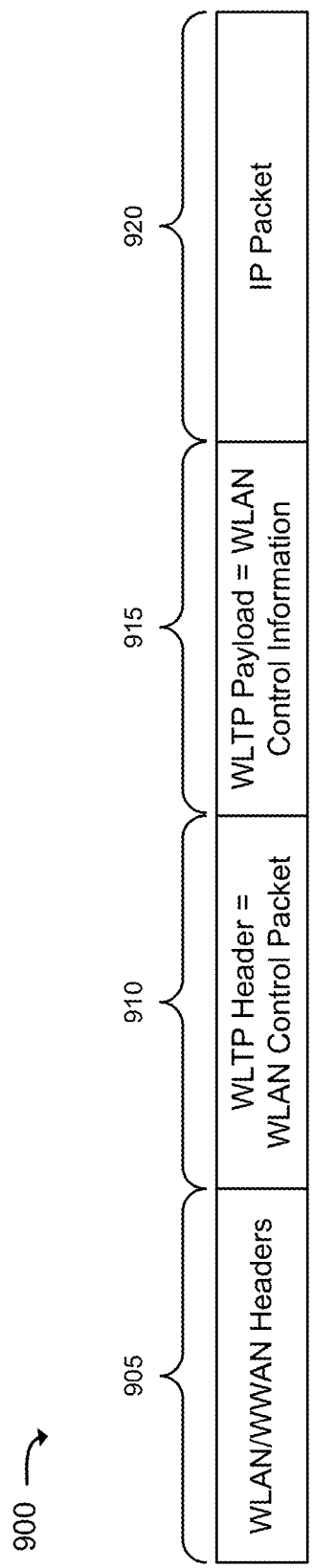
FIG. 9 illustrates an example packet above the PDCP layer, which may include WLAN control information.

While the above description discusses using PDCP packets for WLAN control information, in some implementations, one or more other layers (or a layer between a standard layer) may be used to provide WLAN control information to a UE and/or to an eNB (e.g., an eNB of an integrated AP). For example, information may be provided, between the IP layer and the PDCP layer, for WLAN control information (referred to herein as "WLAN Tunneling Protocol" ("WLTP")). FIG. 9 illustrates an example packet 900, which includes a WLTP header and WLTP payload, and may be used to provide WLAN control information. As shown, packet 900 may include WLAN/WWAN headers 905, which may correspond to, for example, PHY and MAC header information (for WLAN), or PHY, MAC, RLC, and PDCP header information (for WWAN).

Packet 900 may further include WLTP header 910. WLTP header 910 may specify that packet 900 includes WLAN control information (e.g., WLAN measurement and reporting information, bearer split indications, etc.). In some implementations, WLTP header 910 may indicate a size of WLTP payload 915, and/or a type of WLAN control information included in WLTP payload 915. WLTP payload 915 may include substantive WLAN control information (e.g., of the type indicated by WLTP header 910, or WLTP payload 915 may indicate the type of WLAN control information). Packet 900 may further include IP packet 920, which may include an IP header and an IP payload.

Using PDCP (or other layers, such as a layer between the PDCP layer and the IP layer) for WLAN control information, in accordance with some implementations described herein, may enhance the operation of the integrated RAT system, as compared to other potential techniques for passing WLAN control information. For example, WLAN control information may be passed as a MAC control element ("CE") multiplexed with a MAC service data unit ("SDU"), the MAC CE may need to be sent over a signaling radio bearer ("SRB") on the WWAN side, as the data radio bearer ("DRB") traffic may be routed above the MAC layer. This may interrupt deep sleep states on the WWAN side. In contrast, using PDCP (e.g., as described herein) may allow the WLAN control information to be multiplexed with bearer information on both WLAN and WWAN links.

FIG. 10 is a diagram of example components of a device 1000. Some of the devices illustrated in FIGS. 1 and/or 2 may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include processing circuitry, such as a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth® radio, a WiFi radio, a cellular radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of signals have been described with regard to FIGS. 4-7, the order of the signals may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit ("ASIC") or a field programmable gate array ("FPGA"), or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. An integrated radio access technology ("RAT") system, comprising:
    a wireless local area network ("WLAN") component to communicate with a user equipment ("UE") using unlicensed frequency spectrum; and
    processing circuitry configured to:
        receive information from the UE, the received information being associated with a bearer between the UE and the WLAN component, the received information being received via a Packet Data Convergence Protocol ("PDCP") layer;
        determine, based on the received information, one or more parameters relating to the bearer between the UE and the WLAN component, wherein the one or more parameters include at least one of:
            a maximum uplink throughput of traffic that is permissible to be sent, by the UE, via the bearer between the UE and the WLAN component,
            a maximum amount of traffic that is permissible to be sent, by the UE, via the bearer between the UE and the WLAN component,
            a ratio of total traffic, sent by the UE, that is permissible to be sent via the bearer between the UE and the WLAN component, or
            a maximum probability of transmission of traffic, to the WLAN component, by the UE; and
        provide the one or more parameters to the UE, the one or more parameters causing the UE to modify a manner in which traffic is transmitted from the UE over the bearer between the UE and the WLAN component.

2. The integrated RAT system of claim 1, wherein providing the one or more parameters to the UE includes:
    providing the one or more parameters to the UE at the PDCP layer.

3. The integrated RAT system of claim 1, further comprising an evolved Node B ("eNB") of a Long Term Evolution network, wherein the information, associated with the bearer between the UE and the WLAN component, is received via the eNB.

4. The integrated RAT system of claim 1, wherein the one or more parameters cause the UE to modify a ratio of:
    a first amount of traffic sent from the UE to the WLAN component, via the bearer between the UE and the WLAN component, and
    a second amount of traffic sent from the UE to a wireless wide area network ("WWAN") component, via a bearer between the UE and the WWAN component, using licensed frequency spectrum.

5. The integrated RAT system of claim 1, wherein the information, received via the PDCP layer, is received in a PDCP packet, wherein a packet data unit ("PDU") type information field in a header of the PDCP packet indicates that the PDCP packet includes the one or more parameters relating to the bearer between the UE and the WLAN component.

6. The integrated RAT system of claim 5, wherein the PDCP packet further includes information indicating a type of the one or more parameters.

7. The integrated RAT system of claim 5, wherein the type includes at least one of:
Received Channel Power Indicator ("RCPI") information associated with the bearer between the UE and the WLAN component,
Received Signal to Noise Indicator ("RSNI") information associated with the bearer between the UE and the WLAN component,
channel busy/idle information associated with the bearer between the UE and the WLAN component,
access delay measurements associated with the bearer between the UE and the WLAN component,
interference information associated with the bearer between the UE and the WLAN component,
round trip latency associated with the bearer between the UE and the WLAN component,
uplink throughput of traffic sent, by the UE, via the bearer between the UE and the WLAN component, or
downlink throughput of traffic received, by the UE, via the bearer between the UE and the WLAN component.

8. The integrated RAT system of claim 5, wherein the type includes a RAT preference indication.

9. The integrated RAT system of claim 5, wherein the PDU type is indicated by four or more bits in a first octet of the PDCP packet.

10. The integrated RAT system of claim 5, wherein the PDU type is indicated by at least one bit other than the second, third, and fourth bits of a first octet of the PDCP packet.

11. The integrated RAT system of claim 5, wherein the PDCP packet is of a variable size, wherein the size of the PDCP packet is specified by information included in the PDCP packet.

12. The integrated RAT system of claim 1, wherein the processing circuitry is further configured to:
output a set of parameters to the WLAN component, the set of parameters causing the WLAN component to modify a manner in which traffic is transmitted from the WLAN component, to the UE, over the bearer between the UE and the WLAN component.

13. An integrated radio access technology ("RAT") system, comprising:
a wireless local area network ("WLAN") component to communicate with a user equipment ("UE") using unlicensed frequency spectrum; and
processing circuitry configured to:
receive radio link quality information from the WLAN component;
receive information from the UE, the received information being associated with a bearer between the UE and the WLAN component, the received information being received via a Packet Data Convergence Protocol ("PDCP") layer;
determine, based on the received information, one or more parameters relating to the bearer between the UE and the WLAN component, wherein the one or more parameters are further determined based on the radio link quality information received from the WLAN component; and
provide the one or more parameters to the UE, the one or more parameters causing the UE to modify a manner in which traffic is transmitted from the UE over the bearer between the UE and the WLAN component.

14. The integrated RAT system of claim 13, further comprising an evolved Node B ("eNB") of a Long Term Evolution network, wherein the information, associated with the bearer between the UE and the WLAN component, is received via the eNB.

15. The integrated RAT system of claim 13, wherein the one or more parameters cause the UE to modify a ratio of:
a first amount of traffic sent from the UE to the WLAN component, via the bearer between the UE and the WLAN component, and
a second amount of traffic sent from the UE to a wireless wide area network ("WWAN") component, via a bearer between the UE and the WWAN component, using licensed frequency spectrum.

16. A method of controlling an integrated radio access technology ("RAT") architecture, the method comprising:
receiving, by one or more devices of the integrated RAT architecture, information from a user equipment ("UE"),
the received information being associated with a bearer between the UE and a wireless local area network ("WLAN") component of the integrated RAT architecture,
the received information being received via a Packet Data Convergence Protocol ("PDCP") layer,
the received information being received via licensed frequency spectrum,
the bearer between the UE and the WLAN component being associated with unlicensed frequency spectrum;
receiving radio link quality information from the WLAN component;
determining, by the one or more devices and based on the received information, one or more parameters relating to the bearer between the UE and the WLAN component,
wherein the one or more parameters are further determined based on the radio link quality information received from the WLAN component; and
providing, by the one or more devices, the one or more parameters to the WLAN component, the one or more parameters causing the WLAN component to modify a manner in which traffic is transmitted from the WLAN component, to the UE, over the bearer between the UE and the WLAN component.

17. The method of claim 16, wherein the one or more devices include an evolved Node B of a Long Term Evolution network.

18. The method of claim 16, wherein the information, received via the PDCP layer, is received in a PDCP packet, wherein a packet data unit ("PDU") type information field in a header of the PDCP packet indicates that the PDCP packet includes the one or more parameters relating to the bearer between the UE and the WLAN component.

19. The method of claim 18, wherein the PDCP packet further includes information indicating a type of the one or more parameters.

20. The method of claim 19, wherein the type includes at least one of:
- Received Channel Power Indicator ("RCPI") information associated with the bearer between the UE and the WLAN component,
- Received Signal to Noise Indicator ("RSNI") information associated with the bearer between the UE and the WLAN component,
- channel busy/idle information associated with the bearer between the UE and the WLAN component,
- access delay measurements associated with the bearer between the UE and the WLAN component,
- interference information associated with the bearer between the UE and the WLAN component,
- round trip latency associated with the bearer between the UE and the WLAN component,
- uplink throughput of traffic sent, by the UE, via the bearer between the UE and the WLAN component, or
- downlink throughput of traffic received, by the UE, via the bearer between the UE and the WLAN component.

21. The method of claim 19, wherein the PDU type is indicated by four or more bits in a first octet of the PDCP packet.

22. The method of claim 19, wherein the PDCP packet is of a variable size, wherein the size of the PDCP packet is specified by information included in the PDCP packet.

23. A method of controlling an integrated radio access technology ("RAT") architecture, the method comprising:
- receiving, by one or more devices of the integrated RAT architecture, information from a user equipment ("UE"),
- the received information being associated with a bearer between the UE and a wireless local area network ("WLAN") component of the integrated RAT architecture,
- the received information being received via a Packet Data Convergence Protocol ("PDCP") layer,
- the received information being received via licensed frequency spectrum,
- the bearer between the UE and the WLAN component being associated with unlicensed frequency spectrum;
- determining, by the one or more devices and based on the received information, one or more parameters relating to the bearer between the UE and the WLAN component, wherein the one or more parameters include at least one of:
  - a maximum throughput of traffic that is permissible to be sent, by the WLAN component to the UE, via the bearer between the UE and the WLAN component, or
  - a maximum amount of traffic that is permissible to be sent, by the UE to the WLAN component, via the bearer between the UE and the WLAN component; and
- providing, by the one or more devices, the one or more parameters to the WLAN component, the one or more parameters causing the WLAN component to modify a manner in which traffic is transmitted from the WLAN component, to the UE, over the bearer between the UE and the WLAN component.

24. An integrated radio access technology ("RAT") system, comprising:
- means for receiving information from a user equipment ("UE"),
  - the received information being associated with a bearer between the UE and a wireless local area network ("WLAN") component of the integrated RAT architecture,
  - the received information being received via a Packet Data Convergence Protocol ("PDCP") layer,
  - the received information being received via licensed frequency spectrum,
  - the bearer between the UE and the WLAN component being associated with unlicensed frequency spectrum;
- means for receiving radio link quality information from the WLAN component;
- means for determining, based on the received information, one or more parameters relating to the bearer between the UE and the WLAN component,
  - wherein the one or more parameters are further determined based on the radio link quality information received from the WLAN component; and
- means for providing the one or more parameters to the UE, the one or more parameters causing the UE to modify a manner in which traffic is transmitted from the UE over the bearer between the UE and the WLAN component.

25. The integrated RAT system of claim 24, wherein the means for providing the one or more parameters to the UE include:
- means for providing the one or more parameters to the UE at the PDCP layer.

* * * * *